(12) United States Patent
Lawrence

(10) Patent No.: US 8,329,777 B2
(45) Date of Patent: Dec. 11, 2012

(54) PRINTING INK FOR VALUE OR SECURITY DOCUMENTS

(75) Inventor: Clive Edward Lawrence, London (GB)

(73) Assignee: Sun Chemical B.V., Weesp (NL)

( * ) Notice: Subject to any disclaimer, the term of this patent is extended or adjusted under 35 U.S.C. 154(b) by 274 days.

(21) Appl. No.: 12/866,144

(22) PCT Filed: Feb. 5, 2009

(86) PCT No.: PCT/GB2009/000315
§ 371 (c)(1), (2), (4) Date: Sep. 10, 2010

(87) PCT Pub. No.: WO2009/098456
PCT Pub. Date: Aug. 13, 2009

(65) Prior Publication Data
US 2011/0025038 A1   Feb. 3, 2011

(30) Foreign Application Priority Data
Feb. 5, 2008   (GB) .................................. 0802110.7

(51) Int. Cl.
*C09D 11/00* (2006.01)

(52) U.S. Cl. ........... 523/160; 523/161; 283/57; 101/483

(58) Field of Classification Search ................ 523/160
See application file for complete search history.

(56) References Cited

U.S. PATENT DOCUMENTS
5,868,902 A * 2/1999 Howland et al. .............. 162/140
2004/0242726 A1 12/2004 Waki et al.

FOREIGN PATENT DOCUMENTS
EP   0805172 A   11/1997
WO   WO03020835 A   3/2003

OTHER PUBLICATIONS
International Search Report and Written Opinion issued for International Application No. PCT/GB2009/000315, International Filing Date Feb. 5, 2009, Date of Mailing May 13, 2009.

* cited by examiner

*Primary Examiner* — Doris Lee
(74) *Attorney, Agent, or Firm* — McKenna, Long, and Aldridge, LLP.

(57) ABSTRACT

A value document, such as a banknote, is printed using a printing ink or varnish comprising an aqueous dispersion of a preferably aliphatic polycarbonate polyurethane and/or a polyether or polyester polycarbonate polyurethane copolymer having a particle size range from 10 to 400 nm and an acid value no greater than 10 mg KOH/g.

11 Claims, No Drawings

PRINTING INK FOR VALUE OR SECURITY DOCUMENTS

CROSS REFERENCE TO RELATED APPLICATIONS

This application is the United States national phase filing of the corresponding international application number PCT/GB2009/000315, filed on Feb. 5, 2009, which claims priority to and benefit of GB Application No. 0802110.7 filed Feb. 5, 2008, which applications are hereby incorporated by reference in their entirety.

The present invention relates to a printing ink or varnish, especially a screen printing ink or varnish, suitable for use on value or security documents, such as bank notes, securities and the like.

All security documents are required to have good stability and durability. However, in the case of bank notes, these requirements are extreme, as bank notes are routinely and unthinkingly abused by the public—they are folded, crushed, crumpled, subjected to abrasion, exposed to weather, exposed to bodily fluids such as perspiration and others even less acceptable, laundered, dry-cleaned, ironed or torn—and, after having been subjected to this, they are expected to be as legible as when they started. Furthermore, it is essential that the documents should have a reasonable life, measured at least in months and ideally years, despite being passed from hand to hand and possibly suffering the above-mentioned abuse. During this time, the documents, and thus the inks on them, should be resistant to fading or colour change, so that, at worst, any such fading or colour change is imperceptible to the average eye. It is, moreover, a prime requirement that the coating composition should be harmless to humans and domestic animals. Hence, any ink or varnish used on them should, when cured, be robust, water-resistant and flexible. Moreover, certain States are moving away from the use of paper as the substrate for bank notes, and so ideally any ink or varnish for such use should be useable on plastics as well as paper.

In addition, all the usual requirements of coating compositions intended for printing still apply—the coating composition should have a viscosity appropriate to the intended printing method, it should have acceptable toxicity, should ideally minimise the use of unsafe materials in the course of manufacture, even if they are not present in the finished product, and it should allow the use of a wide variety of pigments or dyes in order to maximise the possible colours for printing.

Also, it is preferred that the coating composition should be made available to the end user in as simple a form as possible, which, in practice, means in a single pack, with a storage stability measured in months, ideally at least 6 months, still better at least 12 months.

In order to meet the need to minimise the use of unsafe materials during manufacture, there is pressure to move away from the use of volatile organic solvents to aqueous-based compositions. In particular, N-methylpyrrolidone, which is a very common solvent often used in the preparation of polyurethane dispersions, has had for some years a question mark over its safety, and it would be highly desirable to avoid its use, whilst still maintaining the useful properties that it imparts to the finished product. Solvent free emulsion polymerised polymers contain free surface active agent, which then aggravates the requirement for water-resistance, since a composition applied in solution or dispersion in water may, unless it undergoes a fundamental change, also be easily removable in water or water-based fluids. Polyurethane dispersions are, in general, produced by the aqueous dispersion of pre-formed polymers, which are subsequently dispersed in water. In order to facilitate the aqueous dispersion step the isocyanate terminated prepolymer must have a workable viscosity/molecular weight. This viscosity regulation is achieved by a solvent diluent, commonly N-methyl-pyrrolidone, which remains in the final dispersion. The pre-polymer is then neutralised and transferred to water where spontaneous particle formation occurs. Chain extension is carried out at this stage, producing a high molecular weight polyurethane dispersion. No free surface active agent is usually required, which reduces re-dispersability on hot washing.

Several attempts have been made to meet these multitudinous and varied requirements. For example, WO 03/020835 describes a water-based screen printing ink composition having (a) an acrylic or urethane-acrylic copolymer emulsion; (b) a cross-linker; (c) optionally a catalyst; (d) optionally pigments; and (e) optionally additives, characterized in that said cross-linker comprises at least two different chemical functionalities within the same molecule, wherein a first of said functionalities is chosen such as to form a covalent link with said polymer prior to printing and a second of said functionalities is selected to effect cross-linking of said polymer to cure the printed ink and that the acrylic or urethane-acrylic copolymer emulsion is selected from the group having self-cross-linking properties.

The unmodified acrylic or urethane-acrylic copolymer emulsions used in WO 03/020835 produce inadequate chemical and hot wash resistance. Reacting via a two step process with bi-functional silanes increases chemical and hot-wash resistance. However, these compositions hydrolyse with time in aqueous systems, reacting with acid groups in the polymer, after an induction period of up to two days. This reaction leads to an upward drift of pH, which may increase viscosity and reduce dispersion stability. The drift may be reduced, but not eliminated, by adjustment to near neutrality by the controlled addition of volatile organic amines. Organosilanes may also self condense with time making them unavailable for further reaction. A combination of these effects may compromise wet adhesion with time and particularly hot washing machine resistance, especially on polymer banknote type substrates. Hydrolysis also produces free alcohol (methanol or ethanol), which is undesirable on Health and Safety grounds. The good chemical resistance of these acrylic copolymer systems depends on reaction with the bi-functional silanes, which may take up to a week with low temperature curing. This type of composition is sensitive to excessive mixing, which may initiate premature cross-linking, causing viscosity to rise and effecting machine properties.

These prior art compositions also cause a number of high speed rotary screen running problems, including in-line blocking and impaired distribution to the edge of the screen, producing reduced density at the edge. High speed rotary screen presses commonly have a 4-6 meter drying station at 120-160° C. and a line speed up to 130 m/minutes. Under these conditions, the dwell time is insufficient to dry the print by evaporation. Hence the main drying mechanism is by rapid absorption of the ink into a porous paper like substrate. Where, as with the prior art inks, the polymer properties are such as to prevent adequate penetration, sufficient "drying" may not be achieved, thus leading to the aforementioned problems.

The silanes also can react with pigments in competition with reaction with the polymer: this necessitates pigment pre-treatment, for example with a fluorochemical surfactant. The increase in acid value also reduces base resistance.

We have now surprisingly found that these problems may be overcome and the above desiderata may be achieved by the use of specific polyurethanes, namely aliphatic polycarbonate polyurethanes and/or aliphatic polyester polycarbonate polyurethane copolymers, as the resin component of coating compositions. Dispersions of these polyurethanes have a broad distribution of particle sizes, including some very small particles, unlike the acrylic emulsion polymers. As a result, the polyurethane dispersions used in the present invention exhibit very unique film properties, especially in terms of mechanical properties ideally suited for this high performance surface coating application. In order to develop a film with the requisite mechanical and resistance properties the film particles must coalesce. The high molecular weigh polymer chains are contained within particles. Particles need to deform and coalesce to attain efficient interpenetration of the chains to result in a coherent film. This difficult condition is satisfied by the dispersion of the present invention due to the special dispersion and particle morphology of the polyurethanes used. In addition, porous substrates may be physically interpenetrated by these very small broadly distributed dispersions, producing enhanced adhesion. In the case of non-coated polymer films, solvation of the polymer by the cosolvent is required to produce interpenetration and adhesion.

Such polyurethanes are known. See, for example, US2007/0167565, U.S. Pat. No. 5,349,041, U.S. Pat. No. 5,334,690, EP 0837083, and EP 0969029. They have been used for a variety of purposes, including as automotive and other coatings. However, although U.S. Pat. No. 5,334,690 suggests their use as printing inks, they have not been used for security printing, and we have discovered that, in order to be used successfully for such printing, they must have a particle size within a specific range and a certain minimum acid value. They should also be free from free isocyanate groups.

Thus, the present invention consists in a method of printing a value document, in which a printing ink or varnish comprising a dispersion of a resin is applied to the document, characterised in that the dispersion is an aqueous dispersion of a polycarbonate polyurethane and/or a polyether or polyester polycarbonate polyurethane copolymer having a particle size range from 10 to 400 nm and an acid value no greater than 10 mg KOH/g.

The value documents to which the present invention may be applied include bank notes, passports, gift tokens/vouchers, product authentication certificates, securities certificates etc., as well as any other form of document, whether printed on paper or an a plastics substrate, having similar security requirements to those of bank notes. However, it is thought that the invention will be of greatest value in relation to banknotes.

The polyurethanes of the present invention may be prepared by the reaction of a polyisocyanate with a diol or polyol. The preferred polyols are polycarbonate polyols, although other polyols such as polyether or polyester polyols may be included. The polycarbonate polyols may be produced via an ester interchange reaction or alcoholysis of diethyl carbonate or diphenyl carbonate with a polyol, preferably an alkylene diol. Examples of these diols are 1,4-butanidiol, 1,6-hexanidiol, or an alkylene ether diol e.g. triethylene glycol, glycerol or tripropylene glycol. Polyols with three or more hydroxyl groups, such as trimethylolpropane, glycerol and pentaerythritol can be incorporated for preparing polycarbonate polyols. Mixtures of polycarbonate polyols may be utilised and the polycarbonate backbone may be aromatic or aliphatic, but is preferably aliphatic in nature. It may also be linear or branched.

Examples of diisocyanate compounds include, but are not limited to, hexamethylene diisocyanate (HMDI), isophorone diisocyanate (IPDI), 4,4-dicyclohexylmethane diisocyanate (H12MDI), 2,24-trimethyl hexamethylene diisocyanate, 2,4-tolylene diisocyanate (TDI), 2,6-tolylene diisocyanate (TDI), trimethylhexamethylene diisocyanate (TMDI), diphenylmethane diisocyanate (MDI), tetramethylene diisocyanate (TMXDI), and xylene diisocyanate (XDI). The above diisocyanate compounds may be used individually or in combination. Aliphatic diisocyanates are preferred to ensure low yellowing of the coating. Trimethylhexamine diisocyanate is an example of a preferred aliphatic isocyanate.

The neutralising agent for the aqueous dispersion stage should preferably be a low volatility organic amine, e.g. diethanolamine, diethylamine, triethylamine, morpholine or triethylamine. Triethylamine is an example of a preferred amine for this application.

Covalently cross-linkable functionalities may be built in within the polymer chains to further enhance mechanical and chemical resistance properties.

Suitable polycarbonate backboned polyurethane dispersions are available as Incorez W835/360, W835/364, W835/256 and W835/140 ex (Industrial Copolymers), U9160vp, U9152VP and U6150VP ex (Albedingk Boley).

The high molecular weight anionic polyurethane dispersion has polymer chains arranged with softer and harder segments. Softer segments arise from high molecular weight polyol components, while the harder segments arise from diisocyanates, low molecular weight diols and urethane urea bond sequences. The mixing of these segments yields specific film properties, which may be uniquely tailored to this coating application.

The polyurethanes of the present invention are preferably polydisperse, having an average particle size of from 40 to 100 nm, more preferably from 60 to 90 nm and most preferably about 80 nm. The overall range of particle sizes is from 10 to 400 nm, more preferably from 20 to 200 nm.

It is particularly surprising that these relatively small particle sizes lead to improved adhesion of the composition to the substrate, since the prior art (see, for example, "Resins for Surface Coatings" (SITA), Vol. 2, p 276-p 277, which stresses the importance of the particle size being greater than the pore size, to prevent penetration and poor adhesion.

The acid value of the polyurethane is no greater than 10 mg KOH/g, preferably no greater than 9 and more preferably from 3 to 8.

It is highly desirable that the polyurethane dispersion should form a polymer film highly resistant to plasticisation and hydrolysis—if these happen, the wet tensile strength will be reduced and the film will be susceptible to chemical and physical attack. Polycarbonate polyurethanes are both tough and very hydrolytically stable, and so meet these requirements. As is well known in the art, by the incorporation of specialist functional groups, flexibility and elongation can be maintained. Other polyols, such as polyether polyols, may be incorporated to increase hydrolytic stability still further.

The physical properties of the dried films of polyurethanes also pay a part in the present invention. A polyurethane film having a thickness of 50-100 µm, dried at 22° C. and tested after 7 days, preferably has an elongation at break of from 50 to 350%, more preferably from 150 to 300%. Such a film preferably has a Persoz hardness of 150 to 300 seconds, more preferably from 180 to 260 seconds. Such a film preferably has an ultimate tensile strength of from 10 to 50 MPa, more preferably from 13 to 30 MPa.

The amount of polyurethane may vary over a wide range as is well known in the art. However, in general, we prefer that it should comprise from 60 to 88%, more preferably from 60 to 75%, of the ink or varnish composition.

The remaining components of the printing ink or varnish are conventional and are well known to those skilled in the art. Examples of such other components are described in "Printing Ink Manual", fourth edition, Leach R. H. et al. (eds.), Van Nostrand Reinhold, Wokingham, (1988), the disclosure of which is incorporated herein by reference.

The polyurethane will normally be supplied as a dispersion, in which case a solvent may already be present. If there is no solvent or insufficient solvent, then a solvent should be added. Examples of suitable solvents include 2-(2-butoxyethoxy)-ethanol, tripropylene glycol monomethyl ether, N-ethylpyrrolidone and dipropylene glycol monomethyl ether. Preferred solvents should have boiling points greater than 200° C., flash point greater than 90° C. and evaporation rates 0.02-0.4, where butyl acetate=100. The amount of solvent is preferably sufficient to reduce the minimum film-forming temperature of the ink or varnish to a value in the range from 0 to 40° C. In general, the total solvent preferably comprises from 3 to 10, more preferably from 5 to 9%, of the ink or varnish composition. In the case of flat bed printing some of the added cosolvent may be replaced by a humectant at a level from 1 to 5%, to reduce drying on the screen. These humectants may be based on glycols, polyglycol, polyethers, acid amides, urea and polysaccharides (such as sorbitol), which may be used on their own or in combination. Examples of preferred humectants are Miraplast SCR-47 from Bohner Chemie and diethylene glycol. Glycols like diethylene glycol are capable of lowering the minimum film forming temperature. Humectants, particularly the glycols, may also be added to improve low temperature and freeze/thaw stability.

The overall water content of the printing ink or varnish composition (including not only any added water, but also any water present in the other components of the composition) is preferably from 35 to 45% by weight, in order to achieve optimal printing without excessive substrate cockle.

For certain uses, in particular if the composition is to be printed by rotary screen printing, a defoamer may be incorporated. Preferred defoamers include polysiloxanes, polyether modified polydimethyl siloxane, polyether mixed with polyether siloxane and hydrophobic solids, such as Tego Foamex 805, 810, 812N, 822, 825 and 840 or Byk 011, 019, 024. Where used, the amount of defoamer is preferably from 0.5 to 2.0% of the composition.

Ancillary de-foaming and flow modifying agents may be included, for example:—polyoxyethylenated polyoxypropylene glycol, tertiary acetylenated glycols (e.g. Surfynol 104, 104H, 420—ex Air products), polyoxyethylenated alcohol ethoxylates (e.g. Tego Wet 500) and silicone polymers (e.g. Tego Wet 270, Coat O Sil MP200). Where used, the amount is preferably in the range from 0.1 to 2%, more preferably from 0.1 to 0.5% by weight of the composition.

It may also be necessary to include a thickener, depending on the intended printing technique. Such thickeners and the amounts thereof are well known to those skilled in the art. However in the case of compositions containing iridescent pigments of large particle size and high density, the thickener or blend must be carefully selected to resist settlement under gravitational stress, while having delayed structural recovery to allow particle alignment after printing. Examples of suitable thickeners include Bentone DE, Reolate 125 ex Elementis, Acrysol RM-8W, Byk 420E, and Byk 425 ex Bky Chemie. It was found that the blend that was most preferred should include modified urea and or polyurethane urea at 0.1 to 0.6%. These are available as Byk 420E and Byk 425.

In the case of an ink, the composition should include a pigment, which may be chosen from any of those known for use in printing inks. The amount of pigment is preferably from 15 to 19% of the composition for screen printing applications. In general, we prefer that the weight ratio of pigment to binder (including the polyurethane and any other binder present) should be from 1:1.1 to 1:1.5, in order to optimise abrasion resistance and control finish.

For certain types of pigment used in the printing of value documents, especially iridescent pigments, a pigment dispersant is important to minimise settlement and improve redispersion. The selected dispersant is preferably an amine neutralised polyacrylate, which is particularly suited because, on drying, amine is lost and film water resistance is not compromised. Other dispersants based on chemistries such as styrene maleic anhydride (e.g. Disperse Ayd W22) may be used.

In order to improve hot washing machine resistance, it is also desirable to include a polycarbodiimide in the composition. Examples of polycarbodiimides are given, for example, in U.S. Pat. Nos. 5,258,481 and 5,047,588, the disclosure of which is incorporated herein by reference. The emulsion grades of polycarbodiimides are to be preferred for maximum shelf life. The preferred polycarbodiimide is Carbodelite (ex Nisshinbo Industries). Where a polycarbodiimide is used, the amount is preferably from 1.0 to 2.5% of the composition.

Other conventional additives, such as those identified in "Printing Ink Manual", may also be included in the composition, if desired. It is, of course, well understood that any additives used must not interfere with coating overprint ability, blocking on the reel and sticking on subsequent printing operations.

The compositions of the present invention may be used in any printing technique for printing on a substrate, but are especially suitable for rotary screen printing.

The compositions of the present invention are only able to penetrate the surface of the substrate, and thus adhere to it, if they are of appropriate coating viscosity and if their surface energy is low enough to achieve adequate wetting. This is a precondition for the very fine polyurethane particles penetrating the substrate surface layer. The extent of the penetration is dependent on the surface treatment and the internal substrate structure. Surface coatings, paper compression and internal binders may reduce penetration, in which case adhesion may be compromised. Alteration of co-solvent, wetting and other dispersion additives may alleviate the problem, as is well known in the art. Polymer based banknote substrates are generally coated with print receptive matt layers, with unprinted areas remaining as clear windows. These coatings are commonly approximately 5-7 µm in thickness with a surface tension of 44 mN/m. The compositions of the present invention are capable of wetting and penetrating the surface coated layer, producing good adhesion.

As is well known for the printing of banknotes, the printing ink or varnish should be free from compounds which fluoresce under ultraviolet, should not yellow when heated to 150° C., should meet health and safety criteria (lack of irritancy, toxicity and sensitisation), and should have a flash point greater than 100° C.

The invention also provides value documents, especially bank notes, printed by the method of the present invention.

The invention is further illustrated by the following non-limiting Examples.

EXAMPLE 1

The following components were blended together until homogeneous, with no lumps, to form a thickener blend 1 (amounts are parts by weight):

| | |
|---|---|
| Acrysol RM-8W | 45.8 |
| Collacral VAL | 22.9 |
| Byk 425 | 8.3 |
| De-ionized water | 22.9 |

69.3% by weight of Incorez W835/360 (an aliphatic polyester polycarbonate polyurethane) were then charged into a container, and 3.0% by weight of 2-(2-butoxyethoxy)ethanol (a cosolvent) were added and mixed. The following components were then added in the following order, mixing all the time until there were no bits or lumps:

| | |
|---|---|
| Tego Disperse 750W | 4.0% (Dispersant) |
| Thickener blend 1 | 1.5% |
| Tego Foamex 805 | 1.6% (Defoamer) |
| Lustrapak Yellow fine grade | 18.0% (Security pigment) |
| Coat O Sil MP200 | 0.6% (Polymeric silane) |
| Carbodelite E-O2 | 2.0% [multifunctional polycarbodiimide (40% dispersion)] |

The mixture was immediately filtered twice, each time through a 100 micron filter, after which it was filled into containers, to give a rotary screen ink, acid value 8 mg. KOH/g, pH 9, particle size 30-200 nm.

EXAMPLE 2

Following the procedure described in Example 1, the following components were mixed to form a rotary screen ink, acid value 20 mg. KOH/g, pH 8, particle size 50-200 nm:

| | |
|---|---|
| U9160VP | 64.9% (Aliphatic polyester polycarbonate P.U.D.) |
| 2-(2-Butoxyethoxy)ethanol | 6.3% |
| Tego Disperse 750W | 4.0% |
| Thickener blend 1 | 1.6% |
| Tego Foamex 805 | 1.2% |
| Lustrapak Yellow fine grade | 20.0% |
| Carbodelite E-O2 | 2.0%. |

EXAMPLE 3 (COMPARATIVE)

Following the procedure described in Example 1, the following components were mixed to form a rotary screen ink, pH7-8, particle size 0.5-1.5 microns.

| | |
|---|---|
| Ubatol E95435 | 65.1% (Acrylic self-crosslinking) |
| Aquacer 526 | 8.0% (Ethylene-vinyl acetate dispersion) |
| Tego Disperse 750W | 5.0% |
| Tego Foamex 810 | 1.2% (Defoamer) |
| Thickener blend 2 | 0.7% (see below) |
| Lustrapak yellow fine grade | 20.0% |

Thickener blend 2 was prepared by mixing the following components using a similar procedure to that described in Example 1.

| | |
|---|---|
| Acrysol RM-8W | 50% |
| Collacral VAL | 25% |
| De-ionised water | 25% |

EXAMPLE 4 (COMPARATIVE)

Following the procedure described in Example 1, the following components were mixed to form a rotary screen ink, acid value 20 mg. KOH/g, pH 7-8, particle size 50-250 nm.

| | |
|---|---|
| U938 VP | 73.1% (Aliphatic polyester polyurethane dispersion) |
| Tego Disperse 750W | 4.0% |
| Thickener blend 2 | 0.8% |
| Tego Foamex 805 | 1.2% |
| Wetlink 78 | 0.9% (bi-functional organosilane) |
| Lustrapak yellow fine grade | 20.0% |

Example 4 contains N-methylpyrrolidone in the polyurethane dispersion, and is also a potential sensitizer because of the presence of the bi-functional organosilane.

EXAMPLE 5

Following the procedure described in Example 1, the following components were mixed to form a flat-bed screen ink, acid value 8.0 mg KOH/g, pH 8.5-9.0, particle size 20-100 nm.

| | |
|---|---|
| Incorez W835/360 | 67.0% |
| Diethylene glycol | 4.0% |
| Tego Disperse 750W | 3.0% |
| Thickener blend 1 | 1.8% |
| Tego Foamex 805 | 1.6% |
| Lustrapak fine grade yellow | 20.0% |
| Coat O Sil MP200 | 0.6 |
| Carbodelite EO-2 | 2.0% |

EXAMPLE 6

Following the procedure described in Example 1, the following components were mixed to form a flat-bed screen ink, acid value 8.0 mg. KOH/g, pH8.5-9.0.

| | |
|---|---|
| Incorez W835/360 | 62.0% |
| U9160 VP | 7.3% |
| 2-(2-Butoxyethoxy)ethanol | 3.0% |
| Tego Disperse 750W | 4.0% |
| Thickener blend 1 | 1.5% |
| Tego Foamex 805 | 1.6% |
| Lustrapak yellow fine grade | 18.0% |
| Coat O Sil MP200 | 0.6% |
| Carbodelite E-O3A | 2.0% |

EXAMPLE 7

Following the procedure described in Example 1, the following components were mixed to form a rotary screen ink, acid value 8 mg KOH/g, pH 9, particle size 40-100 nm.

| | |
|---|---|
| Incorez W835/360 | 53.3% |
| APU 10140 VP | 16.8% |
| Tripropylene glycol monomethyl ether | 4.4% |
| Tego Disperse 750W | 4.0% |
| Thickener blend 1 | 1.1% |
| Tego Foamex 805 | 1.8% |
| Lustrapak yellow | 18.0% |
| Carbodelite VO2-L2 | 1.6% |

EXAMPLE 8

Following the procedure described in Example 1, the following components were mixed to form a rotary screen ink, acid value 8 mg KOH/g, pH 9, particle size 40-100 nm.

| | |
|---|---|
| Incorez W835/360 | 70.4% |
| Aquacer 526 | 3.0% |
| Tego Disperse 750W | 4.0% |
| Thickener blend 1 | 1.4% |
| Tego Foamex 805 | 1.4% |
| Lustrapak yellow | 18.0% |
| Carbodelite EO-3A | 2.0% |

EXAMPLE 9

Following the procedure described in Example 1, the following components were mixed to form a rotary screen ink, acid value 8 mg KOH/g, pH 9, particle size 40-100 nm.

| | |
|---|---|
| Incorez W835/360 | 54.6% |
| Incorez W835/256 | 14.6% (Aliphatic polycarbonate polyurethane dispersion) |
| Tego Disperse 750W | 4.0% |
| Tripropylene glycol monomethyl ether | 2.0% |
| Thickener blend 1 | 1.5% |
| Tego Foamex 805 | 1.4% |
| Lustrapak yellow | 20.0% |
| Carbodelite EO-2 | 2.0% |

EXAMPLE 10

Following the procedure described in Example 1, the following components were mixed to form a rotary screen ink, acid value 8 mg KOH/g, pH 9, particle size 40-100 nm.

| | |
|---|---|
| Incorez W835/360 | 51.6% |
| U9800 VP | 16.0% (Aliphatic polyester polyurethane dispersion) |
| Tego Disperse 750W | 4.0% |
| 2-(2-Butoxyethoxy)ethanol | 2.5% |
| Thickener blend 1 | 1.5% |
| Tego Foamex 805 | 1.8% |
| Lustrapak yellow | 20.0% |
| Coat O Sil MP200 | 0.6% |
| Carbodelite EO-2 | 2.0% |

EXAMPLE 11

Following the procedure described in Example 1, the following components were mixed to form a rotary screen ink, acid value 8-9 mg KOH/g, pH 8-9, particle size 40-100 nm.

| | |
|---|---|
| Incorez W835/360 | 48.8% |
| Incorez W835/364 | 21.0% (Aliphatic polycarbonate polyurethane dispersion) |
| Tego Disperse 750W | 3.0% |
| 2-(2-Butoxyethoxy)ethanol | 3.0% |
| Thickener blend 1 | 1.5% |
| Tego Foamex 805 | 1.4% |
| Lustrapak yellow | 18.0% |
| Coat O Sil MP200 | 0.6% |
| Carbodelite EO-2 | 2.0% |

EXAMPLE 12

Following the procedure described in Example 1, the following components were mixed to form a rotary screen ink, acid value 8-9 mg KOH/g, pH 8-9, particle size 40-100 nm.

| | |
|---|---|
| Incorez W835/360 | 54.6% |
| Incorez W835/256 | 14.0% (Aliphatic polycarbonate polyurethane dispersion) |
| Tego Disperse 750W | 4.0% |
| Tripropylene glycol monomethyl ether | 2.0% |
| Thickener blend 1 | 1.4% |
| Tego Foamex 805 | 1.4% |
| Lustrapak yellow | 20.0% |
| Coat O Sil MP200 | 0.6% |
| Carbodelite VO2-L2 | 2.0%. |

Materials

The materials used were obtained as follows:
Incorez W835/360 Industrial Copolymers Ltd.
U938 VP Albedingk Boley.
U9160 VP Albedingk Boley.
APU 10140 Albedingk Boley
Neocryl XK11 NeoResins.
Neo Pac E-125 NeoResins.
Ubatol E95435 Cray Valley
Coat O Sil MP200 GE Silicones.
Coat O Sil 1770 GE Silicones
Wetlink 78 GE Silicones.
Carbodelite E-O2, E-03A. Nisshinbo Industries.
Byk 420, 425, 024, 025. Byk Chemie.
Aquacer 526 Byk Chemie.
Lustrapak yellow Merck.
Rheolate 276 Elementis
Acrysol RM-8W. Rohm & Haas
Collacral VAL. BASF
Jonwax 22. BASF Tests Machine Tests (Physical)

All prints were produced on E.C.B. (European Central Bank) specified Banknote paper. The printing was carried out on a Rotary screen Stork machine, incorporating hot air drying. The rotary screen produced feature was converted to a complete value document (Banknote). The Physical tests were conducted according to E.C.B. specifications. The wet and dry Crumple test (8×), and wet and dry Abrasion test have been correlated with feature lifespan. The tests include a 90° C. hot washing machine test. All test scores are marked on a scale of 0-4. The minimum specification for the tests shown is 2. All prints were also subjected to a vibrating balls Abrasion test and tested for Hot ironing resistance. All the examples included passed both tests. The results are shown in Table 1.

TABLE 1

| Ink system | Type of curing | Dry abrasion | Wet abrasion | Hot washing | Dry crumple | Wet crumple | Scratch test | Paper destruction x = no of turns | Lifespan y/n Euro | tropical | extra |
|---|---|---|---|---|---|---|---|---|---|---|---|
| Free radical | UV curing (1-pack) | 4/4 | 3/4 | 2/4 | 3/4 | 3/4 | 4/4 | 1000 > x > 200   3 | y | n | n |
| Free radical | UV curing (2-pack) | 4/4 | 3/4 | 3/4 | 3/4 | 3/4 | 4/4 | 2000 > x > 1000   2 | y | y | y |
| Free radical | Aq. UV curing (2-pack) | 4/4 | 3/4 | 3/4 | 3/4 | 3/4 | 4/4 | 2000 > x > 1000   2 | y | y | y |
| Example 1 | Aq. 1-pack hot air | 4/4 | 3/4 | 3/4 | 4/4 | 4/4 | 4/4 | 1000 > x > 200  1   3 | y | y? | y |
| Example 2 | Aq. 1-pack hot air | 4/4 | 3/4 | 4/4 | 4/4 | 4/4 | 4/4 | 1000 > x > 200  1/2   3 | y | y? | y |
| Example 3 | Aq. 1-pack hot air | 4/4 | 3/4 | 0/4 | 3/4 | 3/4 | 4/4 | 1000 > x > 200   2 | y | n | n |
| Example 4 | Aq. 1-pack hot air | 4/4 | 3/4 | 2/4 | 3/4 | 3/4 | 4/4 | 1000 > x > 200   3 | y | n | n |
| Example 5 | Aq. 1-pack hot air | 4/4 | 3/4 | 1/2/4 | 3/4 | 3/4 | 4/4 | 1000 > x > 200   3 | y | n | n |
| Example 6 | Aq. 1-pack hot air | 4/4 | 3/4 | 2/4 | 3/4 | 3/4 | 4/4 | 1000 > x > 200   3 | y | n | n |

Machine Tests (Chemical)

The Rotary screen printed value documents (Banknotes), were also subjected to the full E.C.B. battery of 16 Chemical tests. All the Examples quoted passed the tests at least to the minimum standard.

Stability Tests

The stability of ink systems were assessed via storage at room temperature and at 40° C. in tightly closed glass containers. Viscosity measurements were made to monitor thickening and changes in structure. The inks were printed and tested for hot washing machine resistance as a function of storage time. The hot washing machine test is very sensitive to changes due to aging of the ink system. Solvent resistance tests based on number of rubs have been used in the past to assess ageing of ink systems. These measurements were found not to correlate with hot washing tests.

A score of 4 out of 4 on the test represents no removal of the printed security feature and 0 represents complete removal.

The test is subject to some variation and is usually repeated on 5 samples and the results averaged out. The structural changes in the inks were assessed using a DIN 4 flow cup at 22° C. and a Bohlin CS Rheometer using cup and bob geometry. Storage tests were suspended if the times on the flow cup had increased by more than 5 seconds. Only samples that passed this assessment were hot washing machine tested. It is to be noted that samples settle to varying degree and they must be remixed until homogeneous before viscosity measurement or printing. The results are shown in Table 2.

TABLE 2

| Ink system | Substrate | Storage in days at 22° C. | Hot washing at 90° C. | Storage in days at 40° C. | Hot washing at 90° C. |
|---|---|---|---|---|---|
| Example 1 | E.C.B. Paper | initial | 3/4/ | initial | 3/4/ |
| | | 35 days | 3/4/ | 33 days | 3 |
| | | 77 days | 3/4/ | 69 days | 3/ |
| | | 133 days | 2/3 | 130 days | 2/3/ |
| | | 220 days | 3/ | 215 days | 2/3/ |
| Example 2 | E.C.B. Paper | initial | 4/ | initial | 4/ |
| | | 30 days | 3/4/ | 30 days | 3/4/ |
| | | 64 days | 3/4/ | 64 days | 3/4/ |
| Example3 | E.C.B. Paper | initial | 2/ | initial | 2/ |
| | | 30 days | 2/ | 30 days | 2/ |
| | | 90 days | 1/2/ | | |
| | | 120 days | 1/ | | |
| Example 4 | E.C.B. Paper | initial | 2/ | initial | 2/ |
| | | 30 days | 2/ | 30 days | 1/ |
| | | 90 days | 1/2/ | | |
| | | 120 days | 1/4 | | |
| Example 6 | E.C.B. Paper | initial | 2/3/ | initial | 2/3/ |
| | | 60 days | 2/3/ | 60 days | 2/ |
| | | 130 days | 2/ | 130 days | 1/2/ |
| | | 160 days | 2/ | | |
| Example 8 | E.C.B. Paper | initial | 2/3/ | initial | 2/3/ |
| | | 60 days | 2/3/ | 60 days | 2/ |
| | | 130 days | 2/ | 130 days | 1/2/ |
| | | 160 days | 2/ | | |

Laboratory Chemical & Physical Tests.

Sample prints were prepared by Screen printing (77T mesh), onto a range of banknote type papers. Prints were also produced via coating with a no 3 bar. All the prints were thoroughly hot air dried. The prints were left for 8 hours and tested with solvents applied with cotton buds. The number of low pressure double rubs was recorded. The prints were also cross-hatch tape tested (Tessa tape). The results were recorded on a 0-4 scale, with 4 representing no removal.

Hot washing machine tests were conducted according to E.C.B. specification.

The results are shown in Tables 3 to 6.

TABLE 3

| | hot machine wash | | | | |
|---|---|---|---|---|---|
| Ink system | ECB paper | BDF paper | G + D paper 1 | G + D paper 2 | Securrency |
| Example 1 | 3/4 | 3/4 | 3/4 | 3/4 | 3/4 |
| Example 2 | 4/4 | 4/4 | 4/4 | 3/4 | 3/4 |
| Example 3 | 1/4 | 1/4 | 1/4 | 1/4 | 1/4 |
| Example 4 | 2/4 | 2/4 | 2/4 | 1/4 | 1/4 |
| Example 6 | 3/4 | 2/4 | 2/4 | 2/4 | 2/4 |

TABLE 4

| | solvent resistance dbl rubs (ipac) | | | | |
|---|---|---|---|---|---|
| Ink system | ECB paper | BDF paper | G + D paper 1 | G + D paper 2 | Securrency |
| Example 1 | 100+ | 100+ | 100+ | 100 | 100+ |
| Example 2 | 100+ | 100+ | 100+ | 100 | 100+ |
| Example 3 | <50 | <50 | <50 | <10 | <20 |
| Example 4 | 100 | 100 | 100 | <100 | <100 |
| Example 6 | <100 | <100 | <100 | <100 | <100 |

TABLE 5

| | solvent resistance dbl rubs (ethanol) | | | | |
|---|---|---|---|---|---|
| Ink system | ECB paper | BDF paper | G + D paper 1 | G + D paper 2 | Securrency |
| Example 1 | 100+ | 100+ | 100+ | 100+ | 100+ |
| Example 2 | 100+ | 100+ | 100+ | 100+ | 100+ |
| Example 3 | <50 | <50 | <50 | <20 | <20 |
| Example 4 | 100+ | 100+ | 100+ | 100 | 100 |
| Example 6 | <100 | <100 | <100 | <50 | <50 |

TABLE 6

| | cross-hatch tape adhesion | | | | |
|---|---|---|---|---|---|
| Ink system | ECB paper | BDF paper | G + D paper 1 | G + D paper 2 | Securrency |
| Example 1 | 4/4 | 4/4 | 4/4 | 2/4 | 4/4 |
| Example 2 | 4/4 | 4/4 | 4/4 | 2/4 | 4/4 |

TABLE 6-continued

| | cross-hatch tape adhesion | | | | |
|---|---|---|---|---|---|
| Ink system | ECB paper | BDF paper | G + D paper 1 | G + D paper 2 | Securrency |
| Example 3 | 4/4 | 4/4 | 4/4 | 1/4 | 4/4 |
| Example 4 | 4/4 | 4/4 | 4/4 | 1/4 | 4/4 |
| Example 6 | 4/4 | 4/4 | 4/4 | 2/4 | 4/4 |

The invention claimed is:

1. A method of printing a value document, in which a printing ink or varnish comprising a dispersion of a resin is applied to the document, characterised in that the dispersion is an aqueous dispersion of a polycarbonate polyurethane and/or a polyether or polyester polycarbonate polyurethane copolymer having a particle size range from 10 to 400 nm and an acid value no greater than 10 mg KOH/g.

2. A method according to claim 1, in which the polycarbonate polyurethane and/or polyether or polyester polycarbonate polyurethane copolymer is an aliphatic polycarbonate polyurethane and/or polyether or polyester polycarbonate polyurethane copolymer.

3. A method according to claim 1, in which the overall range of particle sizes is from 20 to 200 nm.

4. A method according to claim 1, in which the ink or varnish comprises a solvent having a boiling point greater than 200° C.

5. A method according to claim 1, in which the value document is a banknote.

6. A method according to claim 1, in which the polyurethane is polydisperse, having an average particle size of from 40 to 100 nm.

7. A method according to claim 6, in which the particle size is from 60 to 90 nm.

8. A method according to claim 7, in which the particle size is about 80 nm.

9. A method of printing a value document, in which a printing ink or varnish is applied to the document, the ink or varnish comprising:
    from 60 to 88% by weight of an aqueous dispersion of a polycarbonate polyurethane and/or a polyether or polyester polycarbonate polyurethane copolymer having a particle size range from 10 to 400 nm and an acid value no greater than 10 mg KOH/g;
    optionally from 0.5 to 2.0% of a defoamer;
    from 3 to 10% of a solvent; and
    optionally from 15 to 19% of a pigment.

10. A value document printed by a method according to claim 1 and dried.

11. A value document according to claim 10, which is a banknote.

* * * * *